United States Patent
Gerard et al.

(10) Patent No.: US 9,895,028 B2
(45) Date of Patent: Feb. 20, 2018

(54) HOUSEHOLD FOOD PREPARATION APPLIANCE COMPRISING A WORKING CONTAINER WITH A DEVICE TO HEAT THE CONTENTS OF THE WORKING CONTAINER

(71) Applicant: SEB S.A., Ecully (FR)

(72) Inventors: Emmanuel Gerard, Couterne (FR); Stéphane Retour, Commer (FR)

(73) Assignee: SEB S.A., Ecully (FR)

( * ) Notice: Subject to any disclaimer, the term of this patent is extended or adjusted under 35 U.S.C. 154(b) by 148 days.

(21) Appl. No.: 14/654,064

(22) PCT Filed: Dec. 16, 2013

(86) PCT No.: PCT/FR2013/053106
§ 371 (c)(1),
(2) Date: Jun. 19, 2015

(87) PCT Pub. No.: WO2014/096665
PCT Pub. Date: Jun. 26, 2014

(65) Prior Publication Data
US 2015/0313414 A1    Nov. 5, 2015

(30) Foreign Application Priority Data
Dec. 19, 2012   (FR) ...................... 12 62344

(51) Int. Cl.
A47J 27/04     (2006.01)
A47J 27/16     (2006.01)
(Continued)

(52) U.S. Cl.
CPC ............ *A47J 44/02* (2013.01); *A47J 27/004* (2013.01); *A47J 36/06* (2013.01); *A47J 43/046* (2013.01); *A47J 43/0727* (2013.01)

(58) Field of Classification Search
CPC .. A47J 43/00; A47J 43/07; A47J 27/00; A47J 27/04; A47J 27/16
(Continued)

(56) References Cited

U.S. PATENT DOCUMENTS 7,165,489 B1 *  1/2007  Fernandez ............. A47J 27/02
                                                      126/373.1
7,648,264 B2 *  1/2010  Breviere ............. A47J 43/0716
                                                      366/205
(Continued)

FOREIGN PATENT DOCUMENTS

EP    1922960 A1    5/2008
EP    2347685 A1    7/2011
(Continued)

OTHER PUBLICATIONS

English translation of EP 1922960 B1 to Astegno, published Dec. 23, 2009.*
(Continued)

*Primary Examiner* — Michael Laflame, Jr.
(74) *Attorney, Agent, or Firm* — The Webb Law Firm

(57) ABSTRACT

An electrical food preparation appliance includes a working container enclosing a tool rotated by a motor, a device for heating the contents of the working container and a removable lid that covers the working container, the lid having an opening for inserting ingredients into the working container, at least one steam exhaust orifice, and a removable measuring cap accommodated into said opening for inserting ingredients. The measuring cap can occupy at least two stable positions in the opening of the lid and in that the motion of the measuring cap from one stable position to the other makes it possible to vary the passage cross-section of the steam exhaust orifice.

13 Claims, 4 Drawing Sheets

(51) Int. Cl.
   *A47J 44/02* (2006.01)
   *A47J 36/06* (2006.01)
   *A47J 43/046* (2006.01)
   *A47J 43/07* (2006.01)
   *A47J 27/00* (2006.01)

(58) Field of Classification Search
   USPC .......... 99/293, 348, 352, 410–417; 366/205, 366/206, 207, 314
   See application file for complete search history.

(56) References Cited

U.S. PATENT DOCUMENTS

2005/0018532 A1* 1/2005 Nikkah ................. A47J 43/042
    366/129
2008/0031087 A1* 2/2008 Pryor .................. A47J 43/0716
    366/194

FOREIGN PATENT DOCUMENTS

| FR | 2960758 A1 | 12/2011 |
| JP | H10225368 A | 8/1998 |
| WO | 2011154647 A1 | 12/2011 |

OTHER PUBLICATIONS

English translation of WO 2011154647 to Landemaine, published Dec. 15, 2011.*

* cited by examiner

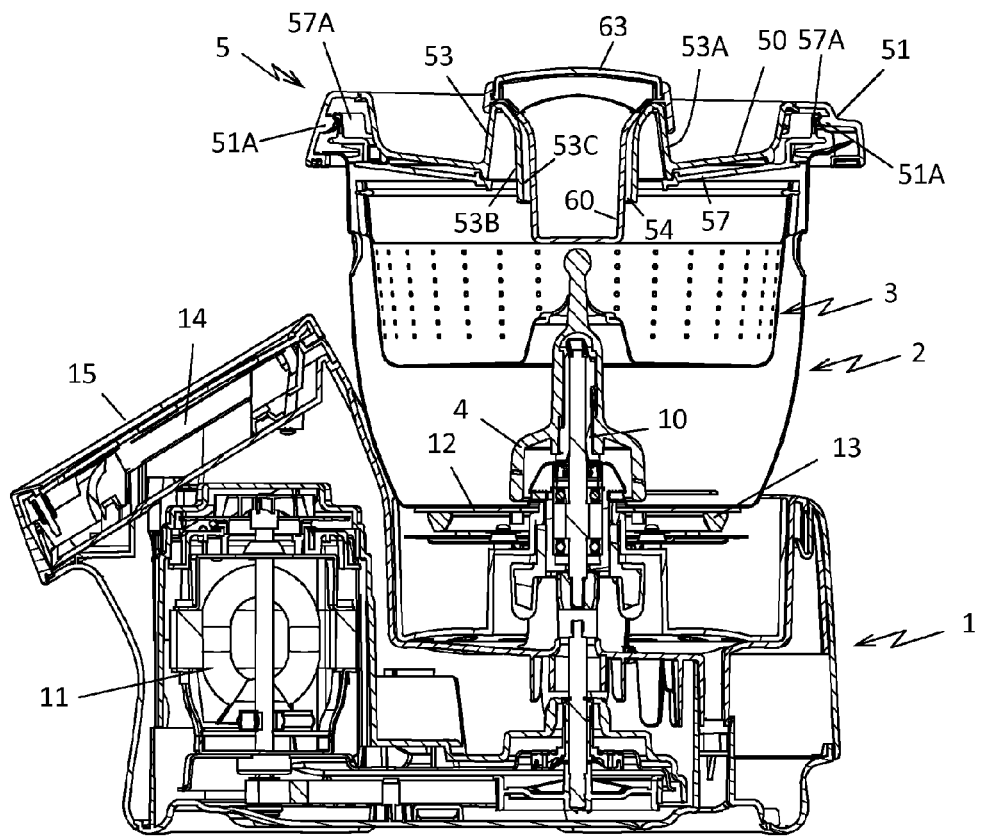
Fig 2
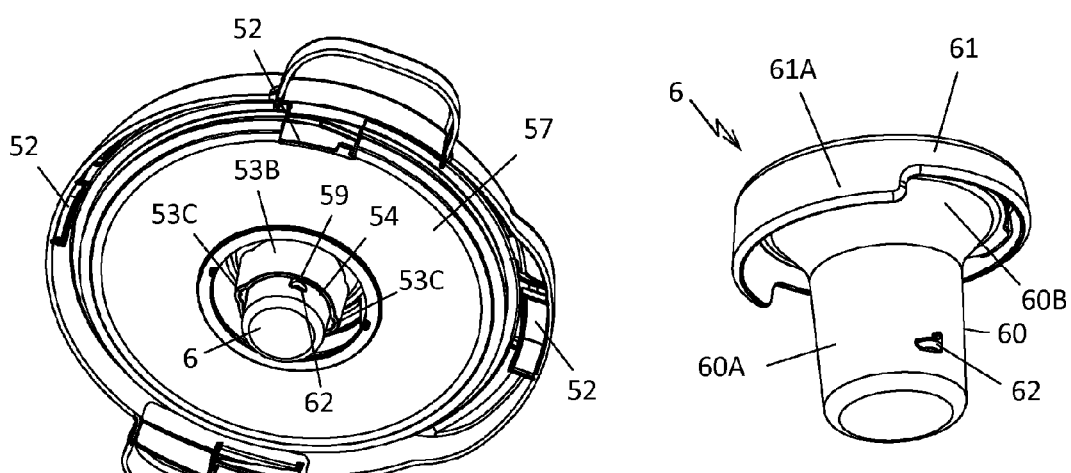
Fig 3
Fig 6

HOUSEHOLD FOOD PREPARATION APPLIANCE COMPRISING A WORKING CONTAINER WITH A DEVICE TO HEAT THE CONTENTS OF THE WORKING CONTAINER

CROSS-REFERENCE TO RELATED APPLICATIONS

This application is the United States national phase of International Application No. PCT/FR2013/053106 filed Dec. 16, 2013, and claims priority to French Patent Application No. 1262344 filed Dec. 19, 2012, the disclosures of which are hereby incorporated in their entirety by reference.

BACKGROUND OF THE INVENTION

Field of the Invention

This invention falls in the general technical area of electrical appliances for food preparation comprising a working container which holds a tool that is rotatably driven by a motor, device to heat the contents of working container and a removable cover that closes the working container and, more specifically, relates to a household appliance in which the cover contains an opening to add ingredients into working container, at least one orifice to allow steam to be released and a removable measuring cap that rests in the opening to add ingredients.

Description of Related Art

Known art is patent filing FR 2 960 758 filed by the applicant, a food preparation device comprising a working container which houses a tool which is rotatably driven by a motor, where the working container contains a resistance heating element to heat the contents of the working container and a removable cover with an opening that accepts a removable measuring cap. In this document, the cover also contains a steam-release orifice created by passages located between the measuring cap and the internal wall of the cover creating the opening.

Such a device presents the advantage of allowing food to be cooked in a working container but has, however, the inconvenience of not allowing the user to regulate the steam-release orifice cross-section to the requirements of the recipes and ingredients to be cooked. In effect, certain heat-sensitive ingredients require a greater passage cross-section to allow a larger amount of steam to be released, although other ingredients may be cooked more quickly by reducing the steam release passage cross-section.

Also, one purpose of this invention is to offer a household food preparation appliance that eliminates these inconveniences and is ergonomic and simple and economical to manufacture.

SUMMARY OF THE INVENTION

To this end, the invention relates to a household food preparation appliance with a working container with a bottom which receives a rotary tool rotatably driven by a motor, a heating device to heat the contents of the working container and a removable cover which closes the working container; the cover contains an opening to add ingredients into the working container, at least one steam-release orifice, and a removable measuring cap that rests in the opening to add ingredients, characterized by the fact that the measuring cap may occupy at least two stable positions in the cover opening where the movement of the measuring cap from one stable position to another allows the steam-release orifice cross-section to be regulated.

"Stable position" means a position that the measuring cap may occupy securely without manual assistance from the user.

Such a characteristic has the advantage of allowing the user to regulate the steam-release orifice cross-section by simply moving the measuring cap from one position to another.

In accordance with another characteristic of the invention, the measuring cap may occupy multiple successive stable positions in the opening; moving the measuring cap from one stable position to another progressively varies the steam-release orifice cross-section.

In accordance with another characteristic of the invention, the measuring cap rotates in the opening; measuring cap rotation varies the steam-release orifice cross-section.

In accordance with another characteristic of the invention, the cover contains a projecting funnel near the opening which forms a housing to hold the measuring cap and the steam-release orifice is located on an external funnel wall.

In accordance with yet another characteristic of the invention, the measuring cap contains a peripheral skirt and may be inserted into the opening in a position such that part of the peripheral skirt at least partially covers the steam-release orifice on the external funnel wall.

In accordance with yet another characteristic of the invention, rotating the measuring cap in the funnel varies the degree to which the steam-release orifice is covered by the peripheral skirt.

In accordance with another characteristic of the invention, rotating the measuring cap reduces the steam-release orifice cross-section from 0 to 50%.

In accordance with another characteristic of the invention, on a special angled section of the measuring cap, the peripheral skirt has a long section which descends lower than the rest of the peripheral skirt.

In accordance with another characteristic of the invention, the funnel contains an internal wall in form of a funnel within the external wall that creates an opening to add ingredients and the internal wall forms a housing to hold the measuring cap.

In accordance with another characteristic of the invention, the measuring cap contains a body in the form of cup which attaches to the opening on the inside of the internal funnel wall.

In accordance with another characteristic of the invention, the body contains an external surface with at least one locking lug which can connect, by rotating under a lower edge of the internal funnel wall, to the internal wall which consists of at least one groove extending axially toward the opening to allow the locking lug to move when the measuring cap is placed into and removed from the opening.

In accordance with another characteristic of the invention, the device contains a control panel on the forward face of the device and the steam-release orifice is oriented to the face the back of the device.

In accordance with another characteristic of the invention, the device contains a steam-cooking basket which rests inside the working container.

In accordance with another characteristic of the invention, the cover contains a watertight seal which rests against the working container when the working container is closed by the cover.

Such a characteristic ensures that the cover is watertight at the edge of the working container so that all steam is released through the release orifices on the cover designed for that purpose.

BRIEF DESCRIPTION OF THE DRAWINGS

The purposes, aspects and advantages of this invention are easier to understand using the description provided below of a specific embodiment of the invention presented as a non-limitative example referring to the attached drawings in which:

FIG. 2 is a longitudinal view of the device in FIG. 1;

FIG. 3 is a side view from below of the cover for the device in FIG. 1;

FIG. 6 is a side view of the measuring cap for the cover in FIG. 3;

Only the items necessary to understand the invention have been shown. To facilitate understanding of the drawings, the same items bear the same references in each figure.

DESCRIPTION OF THE INVENTION

Figure 1:
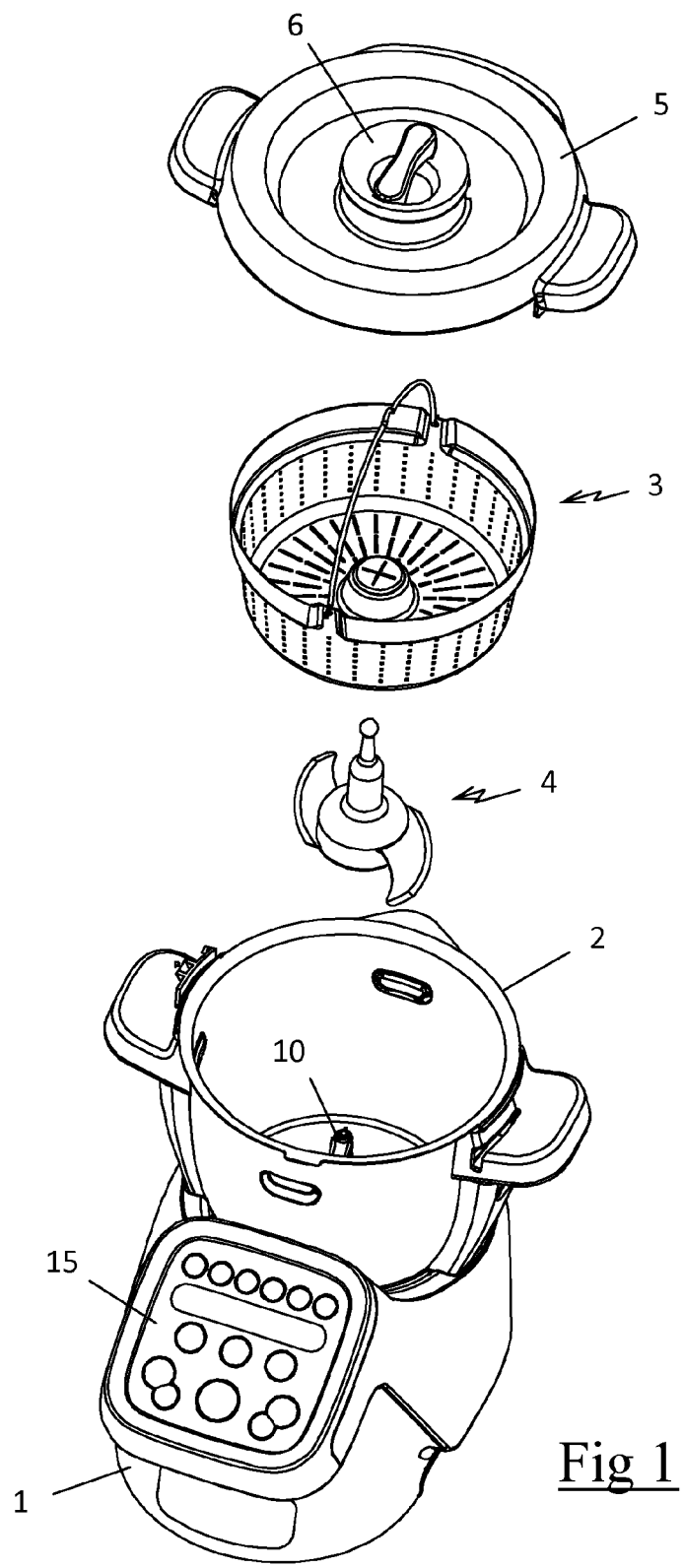
FIG. 1 is an exploded side view of a food preparation device in one specific embodiment of the invention.

FIGS. 1 and 2 represent a food preparation device containing housing 1 and working container 2 which can be removed from housing 1, and working container 2 with perforated basket 3 located in the upper half of working container 2, including a bottom equipped with rotating guide 10 connected by a kinematic chain to motor 11, visible only in FIG. 2; guide 10 may accept tool 4 to chop food located in the bottom of working container 2.

Working container 2 is preferably made of stainless steel and rests on heating plate 12 integrated in housing 1, where plate 12 has a lower face with resistance element 13, an immersion resistance element, to heat the contents of working container 2.

Resistance element 13 and motor 11 are controlled, in a known manner, by circuit board 14 located under control panel 15 on the front face of housing 1; the temperature measured by a temperature probe is input to this circuit board 14 which regulates the current to resistance element 13 to keep the contents of working container 2 at a recommended temperature.

In accordance with FIG. 2, working container 2 is closed by removable cover 5 including transparent upper wall 50, made of a copolyester family plastic material such as Tritan™, marketed by Eastman, surrounded by peripheral crown 51, made of thermoplastic material with high heat retention such as PBT (polybutylene terephthalate), where crown 51 supports bolts 52, visible in FIG. 3, which connect to the upper edge of working container 2 to form a bayonet socket.

Figure 5:
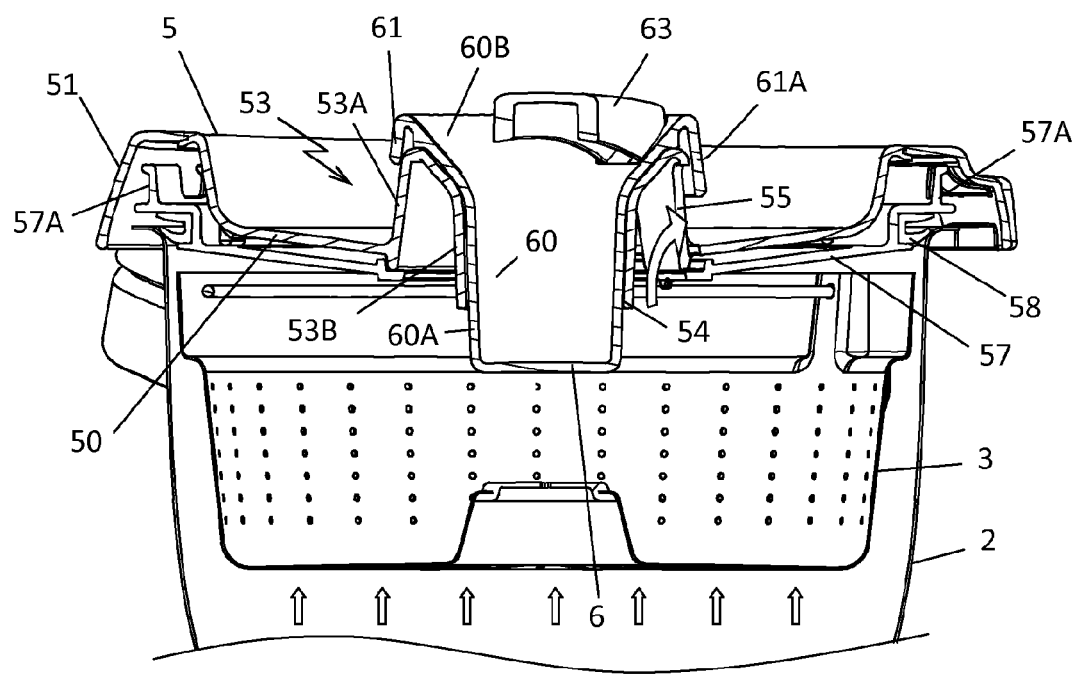
FIG. 5 is a cross-section along line V-V of FIG. 4 of the cover and the upper cross-section of the working container.

In accordance with FIG. 5, upper wall 50 of the cover has projecting center funnel 53, including truncated external wall 53A and internal wall 53B in form of plunging funnel inside external wall 53A, where internal wall 53B has opening 54 which connects directly to the interior of working container 2 and forms a housing for measuring cap 6.

Figure 7:
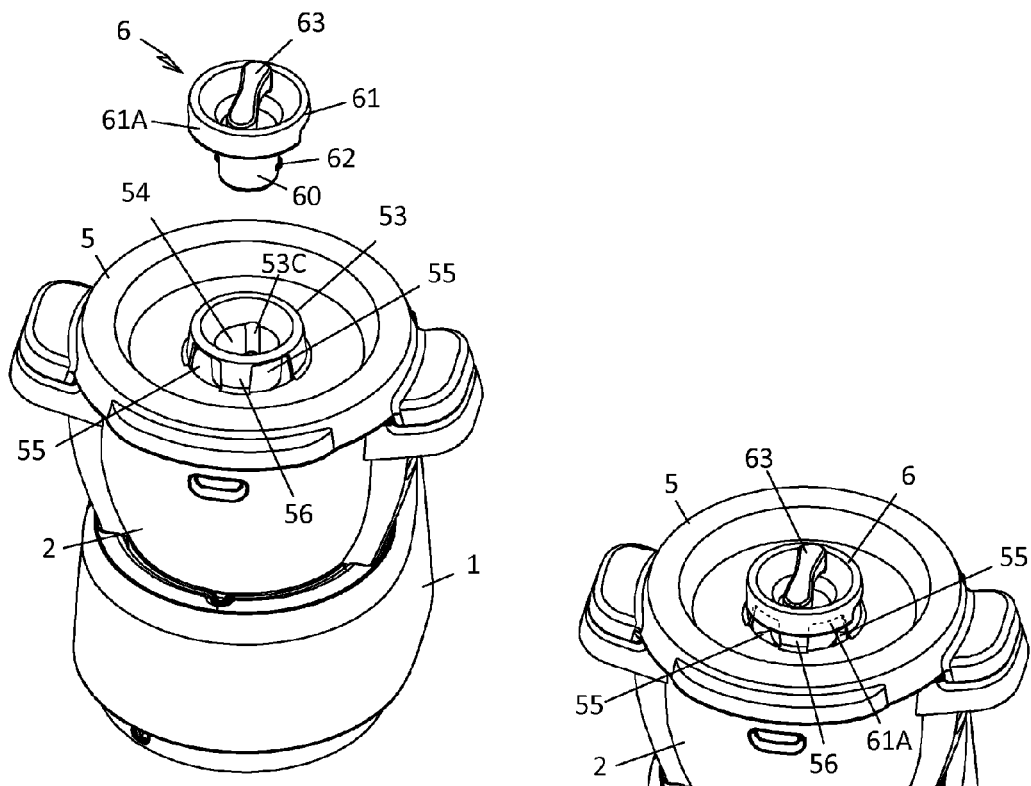
FIGS. 7 to 9 are side views of the rear face of the device in FIG. 1 with the measuring cap shown removed from the cover, in a position to maximize the reduction of the steam-release orifice cross-section and in an intermediate position to reduce the steam-release orifice cross-section, respectively.

The external wall 53A of funnel 53 includes steam-release orifices 55, more clearly visible in FIG. 7, facing the rear face of the device, both of which are attached to support 56, where orifices 55 are preferably approximately 3 cm wide and 2 cm high, basically equal to the height of funnel 53.

Preferably, cover 5 also contains lower wall 57, located under wall upper 50 of the cover, preferably made of a molded transparent plastic material such as polycarbonate or copolyester such as Tritan™, where lower wall 57 includes an orifice facing funnel 53 and is mounted to rotate under upper wall 50.

For example, lower wall 57 is in the form of a disk extending radially from a vein formed at the base of central funnel 53 to peripheral crown 51 of the cover and includes a peripheral edge which supports watertight seal 58 which rests on the upper edge of working container 2; lower wall 57 is held in place by cover 5 by positioning grips 57A which elastically connect to guide rails 51A on the inside of crown 51, visible in FIG. 2.

In accordance with FIG. 6, measuring cap 6 contains body 60 in the form of cup including cylindrical lower section 60A with a closed lower extremity; lower section 60A has an internal surface which preferably has gradations, which are not shown in the figures, to measure the volume in measuring cap 6.

Body 60 of the measuring cap also contains flared upper section 60B which holds peripheral skirt 61 which extends down and contains, in a separate angular section, extended section 61A so that rotating measuring cap 6 within funnel 53 varies the extent to which the orifices 55 of release funnel 53 are covered by peripheral skirt 61.

In the example shown in the figures, extended section 61A of peripheral skirt 61 extends at approximately a 130° angle and is approximately 2 cm in height, where peripheral skirt 61 is approximately 1 cm in height over the rest of the periphery.

Preferably, lower section 60A of measuring cap 6 has an external diameter slightly smaller than the internal diameter of internal wall 53B of funnel 53 and supports two locking lugs 62 located 180° from one another, only one of which is shown in the figures; these two lugs 62 fit in grooves 53C provided for that purpose on internal wall 53B of funnel 53 when measuring cap 6 is placed in opening 54, then interlock with the lower edge of internal wall 53B of the funnel when measuring cap 6 rotates around its longitudinal axis after having fully engaged in opening 54, i.e., when peripheral skirt 61 rests on funnel 53.

Figure 8:
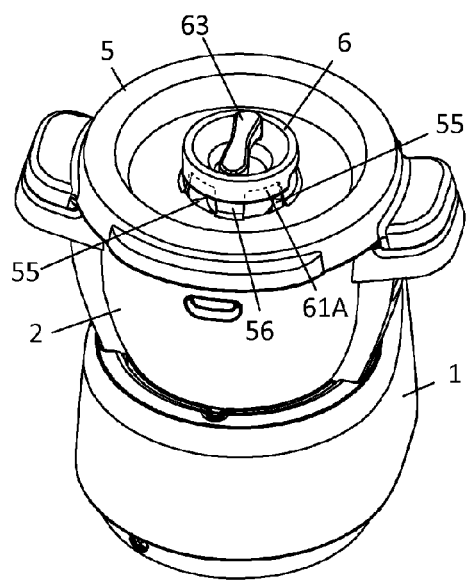

The rotation of measuring cap 6 around its longitudinal axis when measuring cap 6 is completely engaged in opening 54 is preferably restricted by stop 59, visible in FIG. 3, located under the lower edge of internal wall 53B of the funnel; stop 59 works with the two lugs 62 of measuring cap 6 to restrict the rotation of measuring cap 6 trigonometrically in an initial position, shown in FIG. 8, in which orifices 55 are covered to the maximum degree by extended section 61A of peripheral skirt 61, and to restrict the rotation of measuring cap 6 in the opposite direction in a second position, not shown in the figures, in which the orifice coverage by extended section 61A of peripheral skirt 61 is at a minimum.

Figure 4:
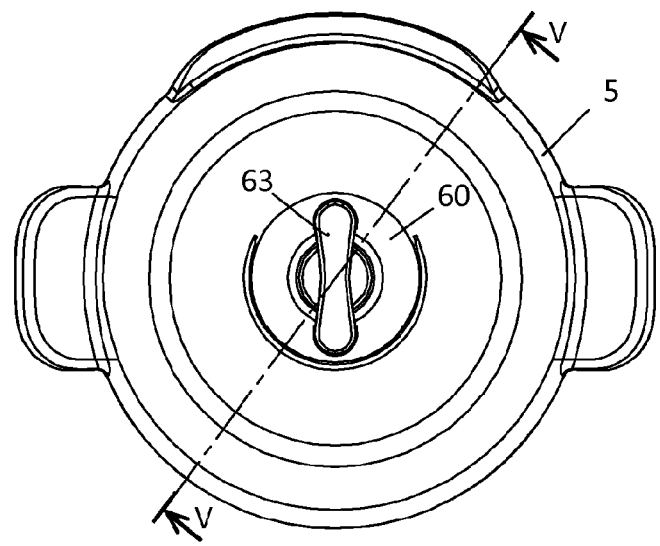
FIG. 4 is a top view of the cover in FIG. 3.

In FIGS. 4 and 5, measuring cap 6 also contains prehensile handle 63 formed by an independent piece, preferably made of a plastic different from that of body 60, to limit the thermal transfer to handle 63. For example, body 60 of the stopper is made of transparent plastic, such as polycarbonate or Tritan-type copolyester, and prehensile handle 6 is made of polypropylene reinforced with 30% glass fibers or saturated polyester reinforced with 20% glass fibers.

The operation of the device will now be described.

When the user would like cook food in the bottom of working container 2 and/or in steam basket 3, he pours water into the bottom of working container 2, then places the ingredients to be cooked in working container 2.

The user then places cover 5 on working container 2 and then locks it by turning it; watertight seal 58 of cover 5 is then compressed against the upper edge of working container 2. The user then presses a button on control panel 15 of the device to initiate an automatic cooking program contained on circuit board 14; this program regulates electrical flow to resistance element 13 to increase the temperature at the bottom of working container 2 and produces steam.

During the cooking phase, the steam generated in working container 2, illustrated by the arrows in FIG. 5, is released from working container 2 through steam release orifices 55 located on external wall 53A of the funnel.

In accordance with the invention, the steam passage cross-section through these orifices 55 may be regulated by moving measuring cap 6 within opening 54 and, in particular, by turning it to change the position of extended section 61A of peripheral skirt 61 to cover more or fewer of the orifices 55.

Accordingly, when cooking food that is not heat-sensitive, the cooking can be accelerated by placing measuring cap 6 in the position shown in FIG. 8 so that extended section 61A of peripheral skirt 61 of measuring cap 6 covers orifices 55 and reduces the steam release cross-section by approximately 40%; the resulting passage cross-section remains sufficient to avoid increasing the pressure in working container 2.

Conversely, when cooking heat-sensitive food, measuring cap 6 is turned 180° to move extended section 61A against the release orifices of the external wall at the front of the device; orifices 55 are then totally unobstructed and maximize the steam release opening.

Figure 9:
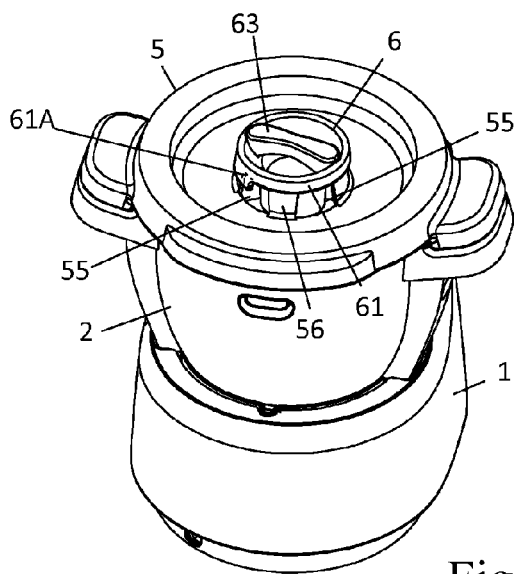

Of course, measuring cap 6 may also be placed in an intermediary position; for example, it could be in the position shown in FIG. 9 in which extended section 61A of peripheral skirt 61 only covers a small portion of one of the two steam release orifices 55.

Therefore, such a food preparation device has advantage of including cover 5 with opening 54 to allow ingredients to be added into working container 2 without opening cover 5, and measuring cap 6, which is housed in this opening 54, which may be placed in various positions to regulate the cross-section of steam release orifices 55 of cover 5 depending on the type of food to be cooked, where a maximum opening is recommended for delicate food and a smaller opening to cook less delicate food.

Of course, the invention is not in any manner limited to the embodiment described and illustrated, which is only provided as an example. Other modifications are possible by, in particular, combining various items or substituting equivalent techniques, without, however, falling outside the scope the invention.

Accordingly, in an embodiment not shown, the measuring cap may be connected to the cover funnel by a helical connection so that rotating the measuring cap on the funnel also changes the height of the measuring cap on the funnel.

In another embodiment not shown, the measuring cap may include an attachment mechanism to attach it at different heights within the cover funnel to vary the steam passage cross-section by simply moving the measuring cap longitudinally within the funnel opening.

The invention claimed is:

1. A household food preparation appliance comprising a working container enclosing a tool which is rotatably driven by a motor, a device to heat contents of the working container and a removable cover that closes the working container; the removable cover contains an opening to add ingredients to the working container, at least one steam release orifice, and a removable measuring cap that is housed in said opening to add ingredients, wherein the measuring cap may occupy at least two stable positions in said opening of the cover without adjusting the placement of the cover on the working container and that moving the measuring cap from one stable position to another varies the passage cross-section of the steam release orifice, wherein the measuring cap comprises a body having a cylindrical lower section, a flared upper section extending upwards from the cylindrical lower section, and a peripheral skirt held by the flared upper section at an end opposite the cylindrical lower section, and wherein the peripheral skirt extends downward from the end of the flared upper section.

2. A household food preparation appliance in accordance with claim 1, wherein the measuring cap may occupy multiple successive stable positions in the opening and that moving the measuring cap from one stable position to another progressively varies the passage cross-section of the steam release orifice.

3. A household food preparation appliance in accordance with claim 1, wherein the measuring cap rotates in the opening and that rotating the measuring cap varies the passage cross-section of the steam release orifice.

4. A household food preparation appliance in accordance with claim 1, wherein around said opening, the cover contains a projecting funnel which forms a housing for the measuring cap and that said steam release orifice is located on an external wall of the funnel.

5. A household food preparation appliance in accordance with claim 4, wherein the peripheral skirt of the measuring cap is located in the opening so that a portion of the peripheral skirt at least partially covers the steam release orifice on the external wall of the funnel.

6. A household food preparation appliance in accordance with claim 5, wherein rotating the measuring cap within the funnel varies the degree to which the steam release orifice is covered by the peripheral skirt.

7. A household food preparation appliance in accordance with claim 6, wherein rotating the measuring cap reduces the passage cross-section of the steam release orifice from 0 to 50%.

8. A household food preparation appliance in accordance with claim 5, wherein the peripheral skirt contains, on a separate angular section of the measuring cap, an extended section which descends lower than the remainder of the peripheral skirt.

9. A household food preparation appliance in accordance with claim 4, wherein the funnel contains an internal wall in form of a cone extending inside the external wall and creates the opening to add ingredients and said internal wall forms a housing for the measuring cap.

10. A household food preparation appliance in accordance with claim 9, wherein the measuring cap fits in the opening inside the internal wall of the funnel.

11. A household food preparation appliance in accordance with claim 1, further comprising a control panel on a front face of the appliance and that the steam release orifice is oriented to a rear face of the appliance.

12. A household food preparation appliance in accordance with claim 1, further comprising a basket for steam cooking which rests inside the working container.

13. A household food preparation appliance in accordance with claim 1, the cover contains a watertight seal which rests against the working container when the working container is closed by the cover.

* * * * *